(12) United States Patent
Kim

(10) Patent No.: US 7,606,022 B2
(45) Date of Patent: Oct. 20, 2009

(54) BATTERY, BATTERY MOUNTING APPARATUS AND ELECTRONIC DEVICE

(75) Inventor: Byoeng-Su Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 11/228,307

(22) Filed: Sep. 19, 2005

(65) Prior Publication Data

US 2006/0082977 A1 Apr. 20, 2006

(30) Foreign Application Priority Data

Oct. 18, 2004 (KR) ............ 10-2004-0082997

(51) Int. Cl.
*H05K 5/00* (2006.01)
*H05K 7/00* (2006.01)
*H04M 1/00* (2006.01)

(52) U.S. Cl. ............... 361/679.01; 455/575.1; 455/575.4

(58) Field of Classification Search ........ 361/727, 361/679.01; 455/575.1, 575.4
See application file for complete search history.

(56) References Cited

U.S. PATENT DOCUMENTS

| | | | | |
|---|---|---|---|---|
| 5,621,618 A * | 4/1997 | Komiyama | ........ | 361/732 |
| 5,903,132 A * | 5/1999 | Ohira et al. | ........ | 320/107 |
| 6,371,535 B2 * | 4/2002 | Wei et al. | ........ | 292/175 |
| 6,490,436 B1 * | 12/2002 | Kaiwa et al. | ........ | 455/90.1 |
| 6,829,495 B2 * | 12/2004 | Lee | ........ | 455/575.1 |
| 6,975,842 B2 * | 12/2005 | Chen | ........ | 455/90.3 |
| 7,197,344 B2 * | 3/2007 | Ahn et al. | ........ | 455/575.1 |
| 7,274,554 B2 * | 9/2007 | Kang et al. | ........ | 361/679 |
| 7,313,410 B2 * | 12/2007 | Tsai | ........ | 455/550.1 |
| 7,346,366 B2 * | 3/2008 | Park | ........ | 455/550.1 |
| 2004/0192418 A1 * | 9/2004 | Nam | ........ | 455/575.1 |
| 2006/0176012 A1 * | 8/2006 | Lee et al. | ........ | 320/107 |
| 2007/0048599 A1 * | 3/2007 | Choi | ........ | 429/97 |

FOREIGN PATENT DOCUMENTS

| | | |
|---|---|---|
| JP | 06-069851 | 3/1994 |
| JP | 10-243066 | 9/1998 |
| KR | 2001-0054451 | 7/2001 |
| KR | 2003-0020504 | 3/2003 |

* cited by examiner

*Primary Examiner*—Jayprakash N Gandhi
*Assistant Examiner*—Anthony M Haughton
(74) *Attorney, Agent, or Firm*—Roylance, Abrams, Berdo & Goodman, L.L.P.

(57) ABSTRACT

An electronic device having a main body and a battery mounting portion. A battery pack is detachably mounted to the battery mounting portion. A resilient member pushes the battery pack away from the battery mounting portion by a predetermined distance when separating the battery pack via a locking/releasing unit. The locking/releasing unit selectively locks and releases the battery pack being received in the battery mounting portion.

20 Claims, 5 Drawing Sheets

BATTERY, BATTERY MOUNTING APPARATUS AND ELECTRONIC DEVICE

CROSS-REFERENCE TO RELATED APPLICATIONS

This application claims the benefit under 35 U.S.C. §119 of Korean Patent Application No. 2004-82997, filed Oct. 18, 2004, the entire disclosure of which is hereby incorporated by reference.

BACKGROUND OF THE INVENTION

1. Field of the Invention

The present invention relates to a battery, a battery mounting apparatus and an electronic device. More particularly, the present invention relates to a locking and releasing assembly for selectively locking and releasing, for example, the battery being received in the battery mounting apparatus.

2. Description of the Related Art

Recently, a variety of portable electronic devices such as camcorders, digital cameras and compound mobile phones have been developed. These devices are for the most part becoming lighter, more compact, and slimmer to facilitate portability.

Generally, portable electronic devices use a battery pack as a power source.

For this purpose, the electronic devices have a battery mounting apparatus for mounting the battery pack. The battery mounting apparatus typically comprises a battery mounting portion provided on a main body of the electronic device, and a locking member for locking a battery received in the battery mounting portion. The locking member is movably mounted to the battery mounting portion and elastically engages with a locking recess formed on the battery pack in order to fix the battery pack.

To separate a battery pack, a user manually pushes and separates the locking member from the locking recess of the battery pack, and withdraws the battery pack. In this case, however, another manipulation of withdrawing the battery pack is required after releasing the battery pack received in the battery mounting portion.

Accordingly, there is a need for an improved battery pack, battery mounting apparatus and an electronic device which detachably mounts to a locking member.

SUMMARY OF THE INVENTION

An exemplary embodiment of the present invention addresses at least the above problems and/or disadvantages. Accordingly, an aspect of the present invention is to provide a battery pack, a battery mounting apparatus and an electronic device having the same.

According to an exemplary implementation, there is provided a battery pack which can be detachably mounted to a locking member which moves in and out with respect to a battery mounting portion of, for example, a main body of an electronic device. The battery pack comprises a battery body having a locking groove which corresponds to the locking member at one side surface thereof. A power connection terminal may be arranged on the battery mounting portion and may be exposed to a lower surface of the battery body. A slideway can be formed between the one side surface and a lower surface of the battery body.

According to an exemplary implementation, the slideway is slanted by an angle corresponding to an angle of a slope formed at an end of the locking member.

According to an exemplary implementation, the slideway is slanted by approximately 45° with respect to the one end of the battery body.

According to another exemplary implementation, there is provided a battery locking apparatus which detachably mounts a battery pack with respect to a battery mounting portion of a main body of an electronic device comprising a resilient member which moves the battery pack a predetermined distance from the battery mounting portion when releasing the battery pack from the battery mounting portion. A locking/releasing unit selectively locks and releases the battery pack with the battery mounting portion and rapidly releases the battery pack.

According to an exemplary implementation, the resilient member protrudes a predetermined distance from a bottom of the battery mounting portion and is formed as a resilient piece which is biased by an external force.

According to an exemplary implementation, the resilient piece is integrally formed with the battery mounting portion.

According to exemplary implementation, the locking/releasing unit comprises a locking member which moves in and out of the battery mounting portion to selectively engage with and release from the battery pack. A pressing member presses the locking member in a direction to engage with the battery pack. The locking member moves the battery pack in a direction to release the battery pack.

According to an exemplary implementation, the battery pack comprises a locking groove formed on one side surface thereof to engage with the locking member and a slideway to move the locking member into contact with the locking member at a lower part of the locking groove.

According to an exemplary implementation, the slideway is slanted by a predetermined angle and is formed at an edge between the one side surface and a lower surface of the battery pack. The lower surface contacts with the resilient member.

According to an exemplary implementation, the locking member comprises at an end thereof a slope corresponding to the slideway.

According to an exemplary implementation, the slideway and the slope are slanted by approximately 45°.

According to still another exemplary implementation, an electronic device comprises a main body having a battery mounting portion, a battery pack detachably mounted to the battery mounting portion, a resilient member which moves the battery pack a predetermined distance from the battery mounting portion to release the battery pack from the battery mounting portion, and a locking/releasing unit which selectively locks and releases the battery pack being received in the battery mounting portion.

According to an exemplary implementation, the battery pack comprises a locking groove formed on one end of a battery body and a slideway formed at a lower part of the locking groove which is pressed via the locking/releasing member in contact with the locking/releasing unit in a direction which separates the battery pack from the battery mounting portion.

According to an exemplary implementation, the slideway is slanted by a certain angle and formed at an edge between the one side surface and a lower surface of the battery pack, the lower surface contacts with the resilient member.

According to an exemplary implementation, the locking/releasing unit comprises a locking member movably mounted to the main body to engage with the locking groove according to a state of the battery pack with respect to the battery mounting portion and contacts with the slideway. A pressing member moves the locking member toward the battery pack.

According to an exemplary embodiment, the locking member comprises a locking portion corresponding to the locking groove and the slideway and an operation portion connected to the locking portion which is partially exposed around the battery mounting portion.

According to an exemplary implementation, the locking portion has a slope at a leading end thereof which corresponds to the slideway.

According to an exemplary implementation, the slideway and the slope are slanted by approximately 45° to correspond to each other.

BRIEF DESCRIPTION OF THE DRAWING FIGURES

The above aspect and other features of the present invention will become more apparent by describing in detail exemplary embodiments thereof with reference to the attached drawing figures, in which like reference numerals refer to like parts, wherein.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
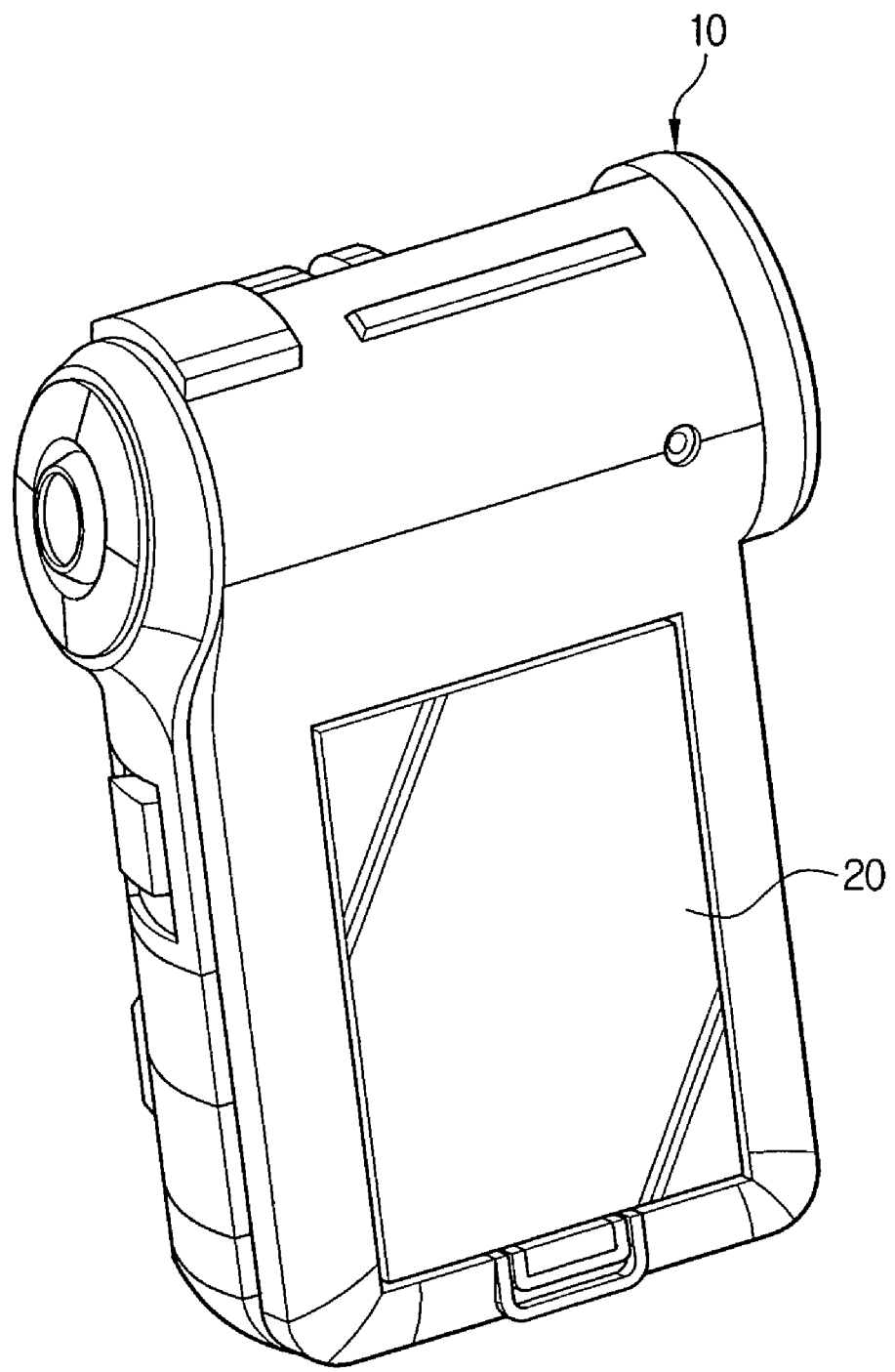
FIG. 1 is a schematic perspective view of an electronic device according to an exemplary embodiment of the present invention.
Figure 2:
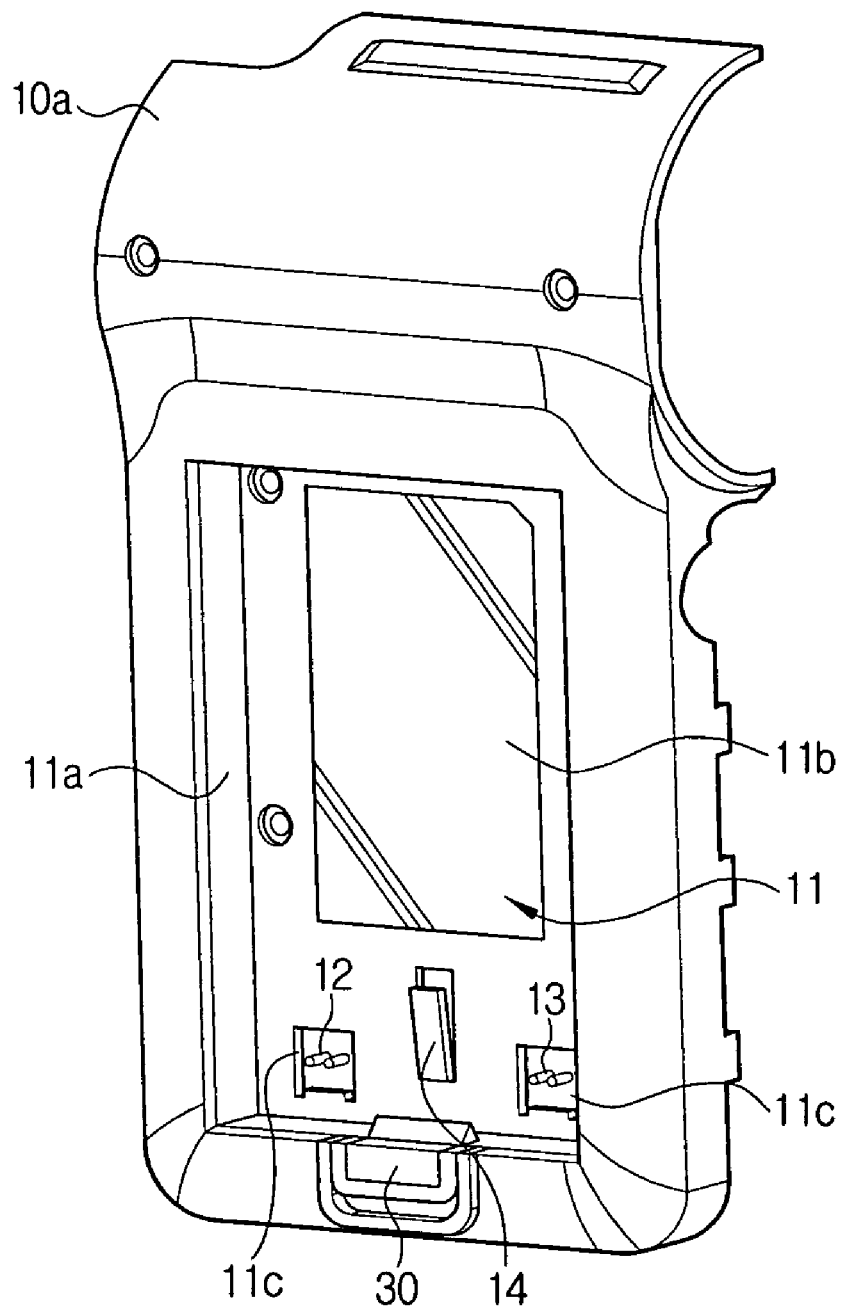
FIG. 2 is a perspective view of an outer casing of the electronic device of FIG. 1.

Referring to FIGS. 1 and 2, an exemplary portable photographing apparatus for photographing an image will be explained as an example of an electronic device according to an exemplary embodiment of the present invention. The electronic device comprises a main body 10, and a battery pack 20 detachably mounted to the main body 10.

The main body 10 has a battery mounting portion 11 arranged on one side. In an exemplary implementation, the battery mounting portion 11 is provided on an outer casing 10a of the main body 10.

The battery mounting portion 11 has an inner wall 11a which is formed corresponding to an outline of the battery pack 20. The inner wall 11a surrounds and receives the battery pack 20. Connection terminals 12 and 13 can be provided for electrical connection with a terminal of the battery pack 20. The connection terminals 12 and 13 protrude from a bottom 11b of the battery mounting portion 11. In the exemplary embodiment, the connection terminals 12 and 13 are positioned to incline toward one side with respect to a longitudinal direction of the battery mounting portion 11. The connection terminals face outwardly through an opening 11c formed in the bottom 11b of the battery mounting portion 11.

In addition, the bottom 11b of the battery mounting portion 11 has a resilient member 14. The resilient member 14 can resiliently contact with a lower surface of the battery pack 20. The resilient member 14 can be formed as a resilient piece integrally formed with the bottom 11b of the battery mounting portion 11. Also, the resilient member 14 projects a certain distance from the bottom 11b of the battery mounting portion 11. The resilient member 14 is pushed inwardly by the battery pack 20 mounted to the battery mounting portion 11 and thereby moves to a position substantially coplanar with the bottom 11b. The transformed resilient member 14 contacts the lower surface of the battery pack 20. Consequently, when the battery pack 20 is released from the battery mounting portion 11, the battery pack 20 is forced outwardly by the resilient member 14. Therefore, at least a portion of the battery pack 20 protrudes from the battery mounting portion 11. The resilient member 14 may be arranged to incline toward a locking/releasing unit 30, which will be described hereinbelow. Consequently, the battery pack 20 is moved relatively quickly away from the battery mounting portion 11 when released via the locking/releasing unit 30. In other words, the resilient member 14 usually reduces the time it takes to release the battery pack 20 from the battery mounting portion 11.

Figure 3:
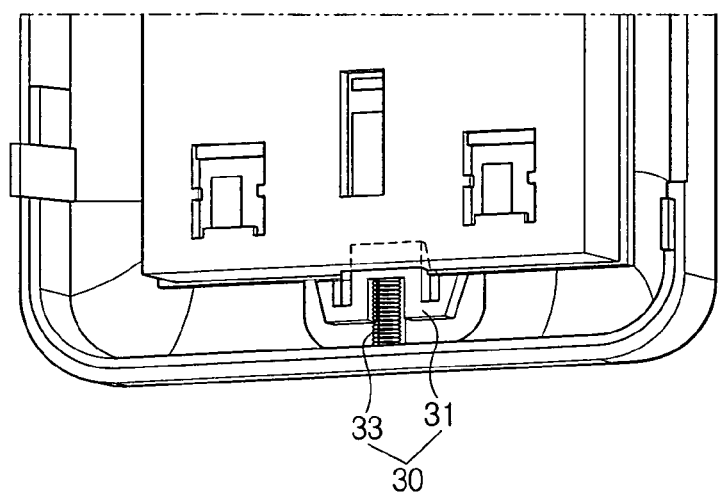
FIG. 3 is a perspective view showing the certain parts of FIG. 2.
Figure 4:
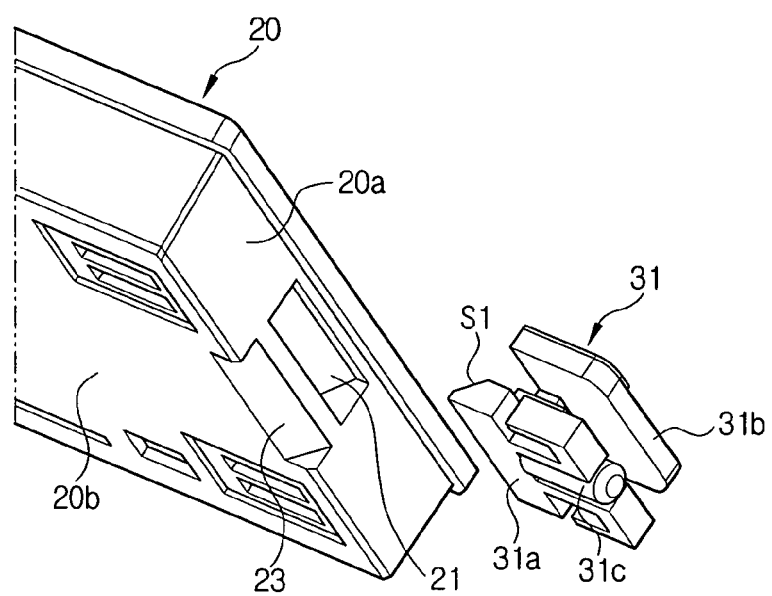
FIG. 4 is a perspective view of a battery pack and a locking/releasing unit of FIG. 1.

In an exemplary implementation, the battery mounting portion 11 is provided with the locking/releasing unit 30 which locks or unlocks the battery pack 20. Referring to FIGS. 3 and 4, the locking/releasing unit 30 comprises a locking member 31 which appears and disappears with respect to the battery mounting portion 11 and a pressing member 33 for resiliently pressing the locking member 31 so that the locking member 31 appears and disappears with respect to the battery mounting portion 11.

The locking member 31 is mounted to the outer casing 10a to move a predetermined distance. As shown in FIG. 4, the locking member 31 has a locking portion 31a and an operation portion 31b integrally formed therewith and spaced a predetermined distanced from each other. The operation portion 31b is exposed to an outside of the outer casing 10a, and the locking portion 31b is disposed within the outer casing 10a. As the locking member 31 moves, the locking portion 31a moves into and out of the battery mounting portion 11. The locking portion 31a has a slope s1 formed at a leading end thereof and a boss 31c integrally formed with a latter end thereof for connection with the pressing member 33.

Figure 5:
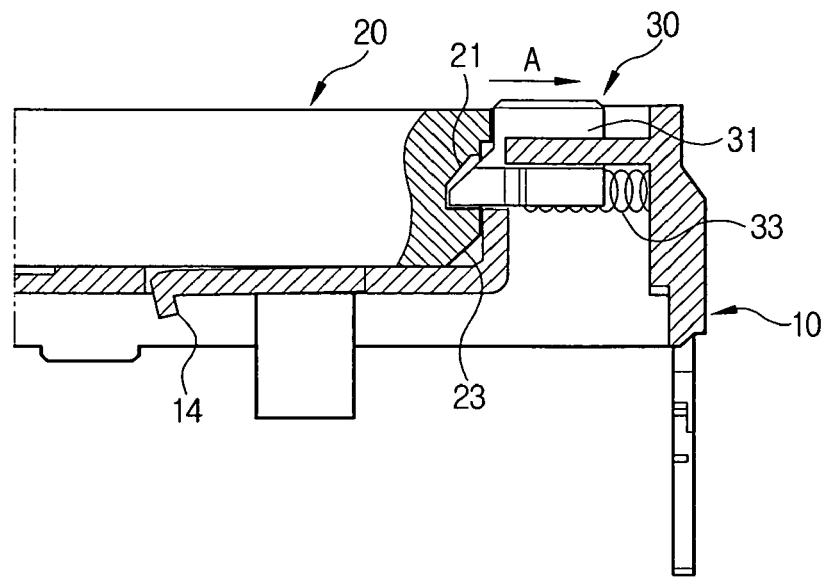
FIG. 5 is a partial, sectional view showing the battery pack received in a battery mounting portion of FIG. 2.

A locking groove 21 engages with the locking portion 31a and is formed on one side surface 20a of the battery pack 20. As shown in FIG. 5, the locking groove 21 is formed at a predetermined distance corresponding to the leading end of the locking portion 21a in a state that the battery pack 20 is mounted in contact with the battery mounting portion 11. In addition, the one side surface 20a of the battery pack 20 has a slideway 23 formed as a slope corresponding to the slope s1 formed at the leading end of the locking portion 31a. More specifically, the slideway 23 is formed on an edge between the one side surface 20a and a lower surface 20b of the battery pack 20. The slideway 23 is disposed at a predetermined distance to contact with the slope s1 of the locking member 31 in a state that the battery pack 20 is released from the battery mounting portion 11 and withdrawn by the resilient member 14 by a predetermined distance. Therefore, the slideway 23 and the slope s1 slide with respect to one another via the locking member 31 being moved by the pressing member 33 toward the battery mounting portion 11, thereby further withdrawing the battery pack 20.

The operation of mounting and separating the battery pack 20 with respect to the above-structured electronic device, according to an exemplary embodiment of the present invention, will now be described with reference to FIGS. 5 through 8.

Figure 6:
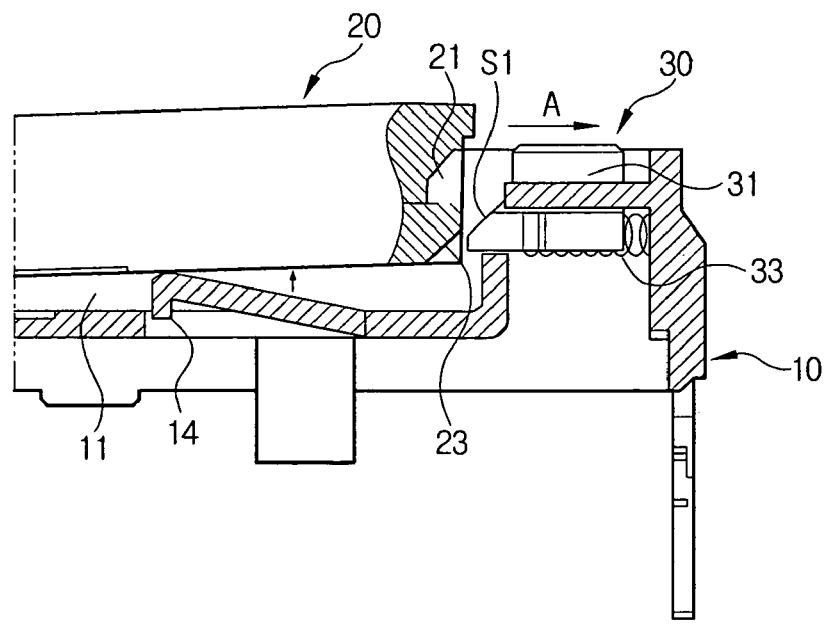
FIG. 6 is a partial, sectional view showing the battery pack released from a state of FIG. 5.

FIG. 5 shows the battery pack 20 received in the battery mounting portion 11. In this state, the leading end of the locking portion 31a of the locking member 31 is fixedly inserted in the locking groove 21 of the battery pack 20. The resilient member 14 is biased to a position substantially coplanar with the bottom 11b of the battery mounting portion 11, being pressed by the lower surface 20b of the battery pack 20. If a user pushes the operation portion 31b of the locking member 31 in the direction of arrow 'A', the locking portion 31a of the locking member 31 escapes from the locking groove 21 as shown in FIG. 6. The battery pack 20 released from the battery mounting portion 11 is lifted by a recovery force of the resilient member 14 by a predetermined distance from the battery mounting portion 11. The lifted height of the battery pack 20 is determined by a height of the resilient member 14.

Figure 7:
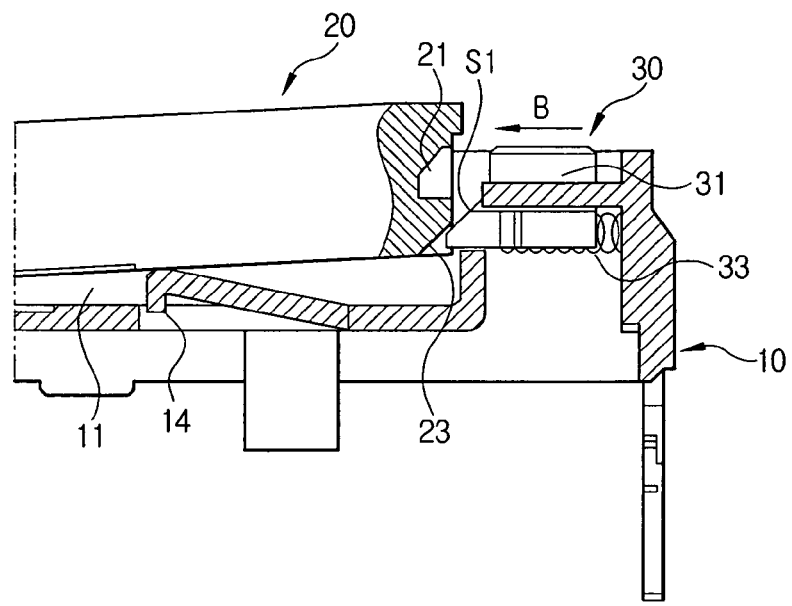
FIG. 7 is a partial, sectional view showing a locking member being moved to a locking position from a state of FIG. 6.
Figure 8:
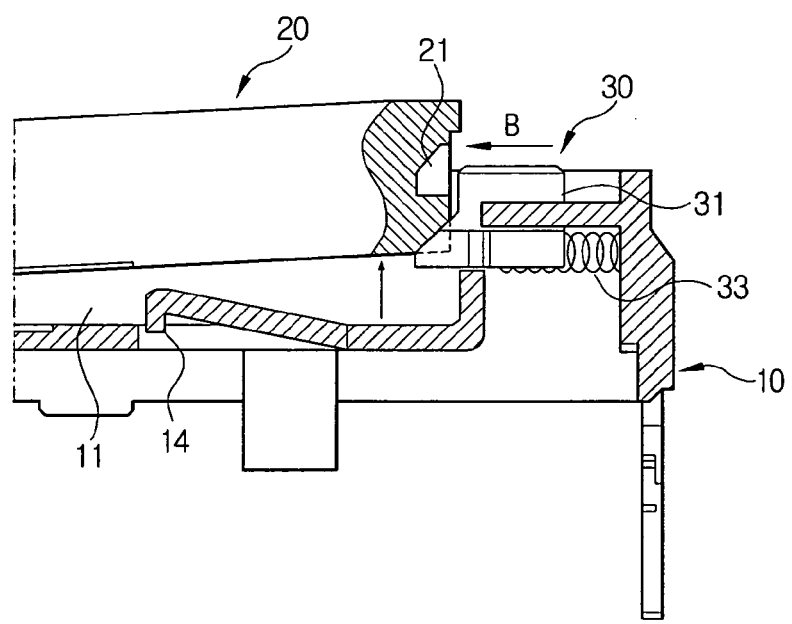
FIG. 8 is a sectional view showing the battery pack of FIG. 7 being pushed by the locking member and lifted by a certain height from the battery mounting portion.

If the user releases the operation portion 31b in a state that the battery pack 20 is lifted by the predetermined distance, the locking member 31 moves in an arrowed direction 'B' by a resilient force of the pressing member 33, as shown in FIG. 7. Therefore, the slope s1 of the locking member 31 comes in contact with the slideway 23 of the battery pack 20. When the locking member 31 moves in the direction of arrow 'B' by the pressing member 33, the slope s1 pushes the slideway 23 as shown in FIG. 8, thereby further moving the battery pack 20 an additional distance. In other words, the lower surface 20b of the battery pack 20 protrudes, being separated from the resilient member 14 and supported by the slope s1 of the locking member 31.

Thus, the battery pack 20 can be separated relatively easily by increasing the distance of the battery pack 20 is withdrawn using the locking member 31.

Meanwhile, according to the present exemplary embodiment, the slideway 23 of the battery pack 20 and the slope s1 of the locking member 31 are slanted by approximately 45° to correspond to each other. Therefore, the slideway 23 and the slope s1 are able to effectively transmit a motional force of the locking member 31 to the battery pack 20 with minimal friction therebetween.

As can be appreciated from the above description, the battery pack 20 according to an exemplary embodiment of the present invention can be relatively easily separated from the battery mounting portion 11 of the main body 10 via the slideway 23 which guides the movement of the locking member 31 in contact with the locking member 31.

Furthermore, according to the battery locking apparatus and the electronic device having the above-described battery pack 20, the battery pack 20 can be relatively easily separated from the battery mounting portion 11 Accordingly, the number of parts and the size of the product can be minimized.

While the invention has been shown and described with reference to certain exemplary embodiments thereof, it will be understood by those skilled in the art that various changes in form and details may be made therein without departing from the spirit and scope of the exemplary embodiments of the invention as defined by the appended claims.

What is claimed is:

1. A battery pack detachably mounted to a locking member which moves in and out with respect to a battery mounting portion, the battery pack comprising:
   a battery body comprising a locking groove corresponding to the locking member arranged on one side surface thereof; and
   a slideway formed between the one side surface and a lower surface of the battery body;
   wherein the slideway is positioned to contact the locking member upon the locking member moving back in with respect to the battery mounting portion after being separated from the locking groove, and thereby separating and releasing the battery body from the mounting portion without impeding the separation of the battery body from the battery mounting portion.

2. The battery pack of claim 1, wherein the battery mounting portion comprises a power connection terminal arranged thereon to face a lower surface of the battery body.

3. The battery pack of claim 1, wherein the slideway is slanted by an angle that is substantially equal to an angle of a slope formed at an end of the locking member.

4. The battery pack of claim 1, wherein the slideway is slanted by approximately 45° with respect to the one side surface of the battery body.

5. The battery pack of claim 3, wherein the slideway is slanted by approximately 45° with respect to the one side surface of the battery body.

6. A battery locking apparatus for detachably mounting a battery pack with respect to a battery mounting portion, the locking apparatus, comprising:
   a resilient member, which moves the battery pack a predetermined distance from the battery mounting portion when the battery pack is released from the battery mounting portion; and
   a locking/releasing unit, which selectively locks the battery pack with the battery mounting portion and releases the battery pack, the locking/releasing unit comprising a locking member that moves in and out of the battery mounting portion to selectively engage with and release the battery pack, and a pressing member that biases the locking member toward the battery mounting portion;
   wherein the locking member pushes the battery pack further away from the battery mounting portion upon returning to an initial position from a battery pack releasing position without impeding the separation of the battery pack from the battery mounting portion.

7. The battery locking apparatus of claim 6, wherein the resilient member protrudes a predetermined distance from a bottom of the battery mounting portion and comprises a resilient piece which is biased by an external force.

8. The battery locking apparatus of claim 7, wherein the resilient piece is integrally formed with the battery mounting portion.

9. The battery mounting apparatus of claim 6, wherein the battery pack comprises:
   a locking groove formed on one side surface thereof to engage with the locking member; and
   a slideway which presses the locking member to push the battery pack further away from the battery mounting portion.

10. The battery mounting apparatus of claim 9, wherein the slideway slants a certain angle and is formed at an edge between the one side surface and a lower surface of the battery pack, and the lower surface contacts with the resilient member.

11. The battery mounting apparatus of claim 9, wherein the locking member comprises at an end thereof a slope which corresponds to the slideway.

12. The battery mounting apparatus of claim 10, wherein the locking member comprises at an end thereof a slope corresponding to the slideway.

13. The battery mounting apparatus of claim 12, wherein the slideway and the slope are slanted by approximately 45°.

14. An electronic device comprising:
   a main body comprising a battery mounting portion;
   a battery pack detachably mounted to the battery mounting portion;
   a resilient member which moves the battery pack a predetermined distance from the battery mounting portion when releasing the battery pack from the battery mounting portion; and
   a locking/releasing unit, which selectively locks and releases the battery pack received in the battery mounting portion and forcibly withdraws the battery pack being separated by the resilient member upon returning to an initial position from a battery pack releasing position without impeding the separation of the battery pack from the battery mounting portion.

15. The electronic device of claim 14, wherein the battery pack comprises:
   a locking groove formed at one end of a battery body; and
   a slideway, which contacts the locking/releasing member after the battery pack is released to withdraw the battery pack from the battery mounting portion.

16. The electronic device of claim 15, wherein the slideway slants a certain angle and is formed at an edge between the one side surface and a lower surface of the battery pack, and the lower surface contacts with the resilient member.

17. The electronic device of claim 15, wherein the locking/releasing unit comprises:
   a locking member movably mounted to the main body to engage with the locking groove according to a state of the battery pack with respect to the battery mounting portion and contact with the slideway; and
   a pressing member which pushes the locking member toward the battery pack.

18. The electronic device of claim 17, wherein the locking member comprises:
   a locking portion corresponding to the locking groove and the slideway; and
   an operation portion connected to the locking portion which is exposed around the battery mounting portion.

19. The electronic device of claim 18, wherein the locking portion comprises a slope at a leading end thereof to correspond to the slideway.

20. The electronic device of claim 19, wherein the slideway and the slope are slanted by approximately 45° to correspond to each other.

* * * * *

UNITED STATES PATENT AND TRADEMARK OFFICE
CERTIFICATE OF CORRECTION

PATENT NO.      : 7,606,022 B2                                    Page 1 of 1
APPLICATION NO. : 11/228307
DATED           : October 20, 2009
INVENTOR(S)     : Byoeng-Su Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this

Fifth Day of October, 2010

David J. Kappos
*Director of the United States Patent and Trademark Office*